United States Patent
Colam

(10) Patent No.: US 8,511,426 B2
(45) Date of Patent: Aug. 20, 2013

(54) SOUND ATTENUATING AIR VENT

(75) Inventor: Stuart Colam, Solihull (GB)

(73) Assignee: Ove Arup & Partners International Ltd (GB)

(*) Notice: Subject to any disclaimer, the term of this patent is extended or adjusted under 35 U.S.C. 154(b) by 0 days.

(21) Appl. No.: 13/394,210

(22) PCT Filed: Sep. 3, 2010

(86) PCT No.: PCT/GB2010/001672
§ 371 (c)(1),
(2), (4) Date: May 16, 2012

(87) PCT Pub. No.: WO2011/027123
PCT Pub. Date: Mar. 10, 2011

(65) Prior Publication Data
US 2012/0217088 A1 Aug. 30, 2012

(30) Foreign Application Priority Data
Sep. 4, 2009 (GB) .................................. 0915517.7

(51) Int. Cl.
*E04F 17/04* (2006.01)

(52) U.S. Cl.
USPC ....................................................... 181/224

(58) Field of Classification Search
USPC ....................................................... 181/224
See application file for complete search history.

(56) References Cited

U.S. PATENT DOCUMENTS

| | | | |
|---|---|---|---|
| 3,207,258 A | 9/1965 | D'Eustachio | |
| 4,104,002 A * | 8/1978 | Ehrich | 415/119 |
| 4,615,411 A * | 10/1986 | Breitscheidel et al. | 181/224 |
| 4,645,032 A * | 2/1987 | Ross et al. | 181/250 |
| 5,597,985 A | 1/1997 | Dear et al. | |
| 5,679,931 A * | 10/1997 | Furse et al. | 181/224 |
| 5,728,979 A * | 3/1998 | Yazici et al. | 181/224 |
| 5,728,980 A * | 3/1998 | Zarnick | 181/224 |
| 6,589,112 B2 * | 7/2003 | Ruach | 454/276 |
| 2002/0050418 A1* | 5/2002 | Jenvey | 181/224 |
| 2002/0115406 A1 | 8/2002 | Ruach | |
| 2003/0221904 A1* | 12/2003 | Ludwig et al. | 181/224 |

FOREIGN PATENT DOCUMENTS

| | | |
|---|---|---|
| DE | 2356184 | 5/1975 |
| DE | 19648200 | 5/1997 |
| JP | 8152888 | 6/1996 |

OTHER PUBLICATIONS

IPO SR GB1014763.5, Jan. 21, 2011.
IPO SR GB0915517.7, Dec. 23, 2009.
ISR PCT GB2010 001672, Feb. 21, 2011.

* cited by examiner

Primary Examiner — Forrest M Phillips
(74) Attorney, Agent, or Firm — Cantor Colburn LLP

(57) ABSTRACT

A sound attenuating air vent comprises: an air path and a discontinuous sound absorbing lining around at least a part of the air path. A method of designing such a sound attenuating air vent comprises: determining a target attenuation performance based on the noise source and the receiver noise sensitivity and the separating construction, and determining a desired arrangement for the discontinuous lining and/or vent based on the target attenuation performance.

20 Claims, 4 Drawing Sheets

SOUND ATTENUATING AIR VENT

FIELD

This invention relates to a sound attenuating air vent and a lining for such an air vent. The air vent may be used for passive ventilation between two areas of a building or between a building and the outside where unrestricted transmission of sound is undesirable.

BACKGROUND

Passive ventilation is frequently specified by a building designer. For spaces to be passively ventilated they must be connected to each other to allow passive (i.e. unforced) movement of air. Ultimately, the air pathways are connected to the outside to allow fresh air to enter the building and to allow circulated air to leave the building.

However, where free movement of air is permitted from one area to another, the air provides a mechanism for sound to be transmitted between the two areas. Allowing air to enter a building from the outside will allow sound from the outside to enter the building. Similarly, allowing air to pass from one internal space to another will allow sound to pass from one space to another. Clearly this is undesirable.

Typically, a passively ventilated building will work most effectively when air is able to move at or above a given rate between internal spaces and/or between outside and inside. In addition, the acoustic specification of a building will place limits on the acceptable transmission of sound between adjacent areas of the building. There is a conflict between the desire to allow free air movement and the desire to avoid ingress and egress of sound. The same issues can also arise in mechanical ventilation systems, for example when it is undesirable for the noise of a fan or other elements of an air conditioning system to be transmitted to a room without some attenuation.

Attempts have been made to address this issue in the past by providing sound attenuating air vents. Typically, such air vents will use an indirect air path lined with a sound absorbing material. The indirect air path is used to ensure that there is no direct path for sound and this has been considered essential in traditional sound attenuating air vent systems. "Periscope" type vents are known, and consist of a vent with a periscope shape, i.e. with two right angle bends, which is lined with a sound absorbent lining.

SUMMARY

Viewed from a first aspect, the invention provides a sound attenuating air vent comprising: an air path and a discontinuous sound absorbing lining around at least a part of the air path.

Surprisingly, the inventor has found that a discontinuous sound absorbing lining provides improved sound attenuation in a selected frequency range compared to a traditional continuous lining. The discontinuities provide additional attenuation of sound at target frequencies compared to a fully lined air vent. The primary mechanism responsible is half-wavelength resistive interference where sound is reflected and partly absorbed at frequencies having an integer multiple of half-wavelength equal or close to a period of the discontinuity in the lining.

It is important to note that this is a different mechanism to half-wavelength related attenuation techniques using the resonant frequency of an open narrow pipe to dampen noise generated within the pipe at that frequency. This type of noise generation is similar to that in an organ pipe, hence this attenuation technique is often called the "organ pipe principle". Examples of the use of this principle can be found in different technical fields to the field of the invention, for example in an exhaust system or forced air pipe as disclosed in JP 8-152888. It is common in exhaust systems to use long pipes with small cross-sectional dimensions. To attenuate the low frequency noise that is produced in the exhaust system an attenuation technique utilising the organ pipe principle can be used since the exhaust pipe is similar to an open organ pipe. Open pipes exhibit resonances by virtue of the 'particle velocity maximum' boundary condition at the open end of the pipe. At integer multiples of this fundamental resonant frequency there are corresponding regions of maximum particle velocity within the pipe. If a porous material is placed in these positions then it is possible to attenuate that particular frequency. The mechanism of attenuation is completely different to that utilised in the present discontinuous lining. The discontinuous lining described herein acts to disturb the sound field in an air vent and produce resistive interference. It is effective for passive ventilation and does not require the ventilation to be forced. It is not connected with longitudinal resonances generated by the pipe itself during forced air flow in a narrow pipe.

Thus, in comparison to devices using the "organ pipe principle" the discontinuous lining described herein does not need to relate the discontinuity to the resonant frequency of the air path. Hence, the air vent of the present invention may optionally be characterised as a vent having a discontinuous lining with a period of discontinuity that does not correspond to the half-wavelength of the resonant frequency of the vent structure. Instead, the lining has lining elements located such that half-wavelength resistive interference occurs at frequencies of interest relating to noise sources at an end of the vent in order to prevent noise from a source at one side of the air vent from passing to the other side of the vent.

A secondary mechanism of attenuation is non-plane wave motion below the cut-on frequency. In other words, low frequency sound that could travel mostly unhindered in a uniformly lined vent of similar dimensions is 'disturbed' by the discontinuous lining and more readily attenuated. This is secondary mechanism also means that the additional attenuation provided by the strips does not need to be at the expense of effective attenuation at other frequencies, as would be expected given that less sound absorbing material is being used.

The discontinuous sound absorbing lining forms areas within the vent where there is no sound absorbing lining. These areas may be left empty. However, in preferred embodiments a part of these areas or optionally the entirety of these areas may be filled with a sound reflecting material. For example, sections of sound absorbing material may be separated by sections of a more rigid and/or more dense sound reflecting material. The addition of a sound reflecting material between areas of the discontinuous sound absorbing lining promotes the attenuation effects of the mechanisms discussed above by providing greater reflection of sound and increasing the disturbance affecting the movement of sound waves. Using the sound reflecting material to fill the entirety of the gaps in the discontinuous sound absorbing lining is advantageous, as it presents a smooth surface of the lining, which provides the least resistance to air movement through the vent.

Hence, in a particularly preferred embodiment the vent has a continuous lining formed of discontinuous sound absorbing material and sound reflecting material placed between some or all of the areas of sound absorbing material and substantially filling the gaps therebetween.

Preferably, the air path is a direct air path. Thus, the air moving through the vent can pass directly from one space to another, without needing to pass through a curved or kinked air path. Such a direct air path would typically be provided by a straight air path, i.e. an air path with straight and parallel sides. However, some deviation from straight can be tolerated and for some installations may in fact be necessary due to limitations arising from other elements of a building, for example to allow the vent to fit around pre-existing structural elements whilst providing a maximum area for airflow.

The inventor has realised that, contrary to established practice, it is not necessary to utilise an indirect air path to achieve the required sound attenuation. The use of a direct air path provides the best aerodynamic performance, as the air flow is not restricted by the resistance inherent in a convoluted indirect air path. Whilst sound could pass directly through the vent if the sound source and receiver were in the same plane as the air path, it has been found that in practice this situation rarely arises, as typically vents for air movement will be positioned at a high or a low position, for example near a ceiling, at floor level, or even as part of an under-floor ventilation arrangement.

The combination of a direct air path and discontinuous sound absorbing lining ensures that the vent has the required acoustic properties whilst minimising the resistance to air movement.

To ensure most effective operation the vent is intended to be positioned out of plane with the sound source and or receiver when it is in use in order to avoid direct transmission of sound through the vent. A preferred embodiment hence comprises a sound attenuating air vent positioned in a structure to be out of plane with the sound source and/or receiver. The structure may include multiple sound attenuating air vents, for example vents at a low level (e.g. less than 500 mm above finished floor level) for introducing fresh air, and vents at a high level (e.g. more than 2500 mm above finished floor level) for extracting air.

With typical positioning of air vents for passive ventilation, it has been found that an air path with a length of at least 500 mm will ensure that sound passes along an oblique path between typical source and receiver locations, i.e. the line of sight between source and receiver is broken. A preferred embodiment therefore comprises a sound attenuating air vent with a length of at least 500 mm.

The discontinuous sound absorbing lining may take any suitable form, i.e. any arrangement of presence and absence of sound absorbent lining material that generates attenuation by one or both of the mechanisms discussed above. The term "lining" is intended to encompass any material used as an internal covering in the vent, i.e. a material applied to an internal surface of the vent. The sound reflecting material may also take any suitable form. Preferably there is sound reflecting material between each area of sound absorbing material, such that the sound reflecting material is used to separate the discontinuous areas of the sound absorbing lining.

The sound absorbing material will typically be less than 100 mm thick. In some embodiments, the material may be less than 75 mm thick or alternatively less than 60 mm thick. The thickness may be from 20 mm to 60 mm, inclusive. For example, a material of about 25 mm thickness or of about 50 mm thickness may be used. The sound reflecting material can have a thickness selected from the same ranges. It is not essential for the thickness of the two types of material to be the same, however it is preferable as this reduces the resistance to air movement, leading to better aerodynamic performance for the vent, especially in the preferred arrangement where the sound absorbing and sound reflecting materials together form a continuous lining.

By "sound absorbing" it is meant that the total reflected sound energy by the sound absorbing material is less than the incident sound energy. Preferably, the sound absorbing material has a sound absorption coefficient of at least 0.6 in the frequency range of interest. By "sound reflecting" it is meant that the material reflects a greater proportion of sound that it absorbs. Preferably the sound reflecting material has an absorption coefficient of less than 0.1 in the frequency range of interest. The sound reflecting material preferably has a density of at least 250 kg/m$^3$. In a preferred embodiment the sound reflecting material has a density of about 600 kg/m$^3$ or a higher density.

The sound absorbing material used for the lining may be any suitable material, for example an open cell foam (e.g. melamine foam) or a fibrous material (e.g. mineral wool) can be used. The sound reflecting material may be any suitable material, for example dense plastic, timber based board or steel.

Advantageously, since the sound reflecting material is generally relatively rigid it can be used to enhance the stiffness of the vent. Increasing the stiffness increases the attenuation. Moreover, since the sound reflecting material can provide a large proportion of the structural strength required by the vent, the vent can be constructed of a more lightweight material than conventional vents, which might typically be of sheet metal construction. The areas of sound reflecting material may be formed integrally with the vent structure, optionally of the same material as the vent structure. For example, in one preferred embodiment the vent is moulded in plastic with plastic ribs forming the areas of sound reflecting material.

In a preferred embodiment the discontinuous sound absorbing lining comprises strips of sound absorbing material. For example, strips of rectangular cross-section may conveniently be used. The strips are preferably positioned in the vent so as to be perpendicular to the direction of the air flow and sound propagation. The use of strips gives a simple and hence easy to manufacture arrangement that also has an effective sound reduction capability. The resistive interference mentioned above occurs for frequencies with integer multiple half-wavelengths equal or close to the period of the strips. For example, there may be 50 mm strips separated by 100 mm gaps or 100 mm strips separated by 50 mm gaps. With this arrangement the strips have a period of 150 mm, which is a half-wavelength of 1.1 kHz, and hence a regular array of such strips would generally provide a maximum attenuation at this frequency and integer multiples thereof i.e. 2.2 kHz, 3.3 kHz etc, depending on the duct dimensions and acoustic properties of the sound absorbing lining. Varying the thickness of the lining can shift the frequencies that are affected, in some cases.

Preferably, some of all of the strips of sound absorbing material are separated by thinner strips or ribs formed of the sound reflecting material. The ribs may have a width selected according to the density of the sound reflecting material so as to provide a minimum mass per unit area of 5 kg/m$^2$, more preferably a minimum mass per unit area of 10 kg/m$^2$. With a lining thickness of 50 mm, ribs with a width of 20 mm may be used with a material density of not less than 250 kg/m$^3$ to achieve a mass per unit area of 5 kg/m$^2$. Hence, in the example above with a period of 150 mm there may be 20 mm wide ribs of sound reflecting material adjacent 50 mm or 100 mm strips of the sound absorbing material. However, since in the most preferred embodiment the sound absorbing material and the sound reflecting material form a continuous layer, a more preferred implementation for a 150 mm period is a sequence of 20 mm wide ribs of sound reflecting material and 130 mm wide strips of sound absorbing material.

In some circumstances, it may be preferable for the discontinuous sound absorbing lining and the sound reflecting material (where present) to be arranged so as to include multiple periods of discontinuity. The different periods may be selected to correspond to a desired set of frequencies that should be attenuated. This irregular arrangement would result in sound attenuation over a wider range of frequencies, though it would be at the expense of the maximum attenuation achieved.

In practice, the arrangement of strips of sound absorbing material and optionally also strips of ribs may be determined by trial and error or empirical methods, with possible arrangements tested using models and numerical analysis to find optimal arrangements for attenuation of desired frequency ranges. Computer software may be provided to enable customised arrangements to be designed for a particular scenario, or to allow a user to be provided with a recommendation for an appropriate 'standard' lining arrangement to meet their requirements.

This adaptability and the capability for a bespoke attenuation to be provided is considered to be an important advantage of the present sound attenuating air vent. It has also been realised that other aspects of the design of a sound attenuating air vent can be optimised for performance at certain frequencies. Hence, the vent preferably has a shape, dimensions, and/or discontinuous lining selected based on a target performance. In a particularly preferred embodiment the target performance is calculated by considering the unwanted noise source, the desired noise level at the receiver and the separating construction. For typical situations within a building considering room types and separating constructions, the required sound attenuating performance of the air path is dominated by sound reduction at the mid-frequencies (e.g. 500 Hz-2 kHz) with much less needed at lower and higher frequencies. Thus, for a typical situation the shape, dimensions, and/or discontinuous lining may be arranged to provide attenuation centred on this frequency range.

To provide a target sound attenuating performance, the discontinuous lining can be provided with varying periods by using an irregular discontinuity as discussed above. Alternatively or in addition, the shape and dimensions of the vent may be selected based on the target performance. Sound is attenuated in proportion to the length of the path along it must travel, and hence the minimum length of the vent may be selected to provide the necessary attenuation. In addition, the cross-sectional dimensions of a vent determine the cut-on frequency, below which sound is poorly attenuated. For example, a 300 mm square duct continuously lined with sound absorbing material will only attenuate effectively for frequencies above 560 Hz. The cross-section also has an effect when sound exits the vent, because the cross-sectional area determines the radiating efficiency of the open ends of the vent. For example, small duct areas exhibit a large 'end reflection' which means that sound, particularly at the low frequencies, is reflected back into the vent at the termination and thus does not efficiently propagate beyond the end of the vent.

The parameters discussed above can be optimised to provide attenuation of sound over a range of frequencies. Thus, in preferred embodiments the length and/or cross-section of the vent are based on the desired target performance, i.e. on a desired range of frequencies to be attenuated and/or on a desired degree of attenuation.

The discontinuous sound absorbing lining is preferably present along the entire length of the vent and/or on all sides of the vent, as this provides the best acoustic performance. The areas of sound reflecting material may also be present on all sides. However, a 100% lined vent is not necessary to provide an improvement in attenuation performance over a conventional lined or unlined vent and so a vent that is only partially lined may be used. For example, for a typical rectangular vent, the lining may be provided only on two internal surfaces, being the upper and lower surfaces when the vent is in use. The lining may also extend along only a portion of the length of the vent, for example it may be present only along the central 60% or 80% of the length of the vent, with the outer ends of length of the vent having no lining or a conventional continuous lining.

The air path extends through the vent from an entrance of the vent to an exit of the vent, with the discontinuous lining positioned between the entrance and exit. Preferably the entrance and/or exit are designed to allow unrestricted movement of air to minimise the resistance to air movement through the vent.

The vent may take any appropriate form or shape. For example, it may be a duct of standard construction, such as the rectangular ducts used in conventional ventilation and air conditioning systems. The vent may also be formed between other elements of a building, for example the upper surface of a vent positioned at ceiling level might be provided by the slab, or an under-floor vent might be formed by part of the cavity of a raised/floating floor. It will be appreciated that the advantages of the discontinuous lining in some of the embodiments discussed above can be realised irrespective of the type of construction of the vent itself.

Hence, viewed from a second aspect, the invention provides a lining for a sound attenuating air vent, the lining comprising a discontinuous layer of sound absorbing material.

In preferred embodiments, the lining includes features as discussed above, for example the lining may comprise strips of sound absorbing material for location perpendicular to the sound propagation direction of the vent. Preferred embodiments include sound reflecting material between some or all areas of sound absorbing material, as discussed above.

The lining may include a continuous backing layer, with sound absorbing material and optionally sound reflecting material mounted on the backing layer in order to form the discontinuous layer of sound absorbing material. With this feature the lining can be installed in the vent as a single element, with the backing layer being secured to the vent surface. The backing layer may include a self adhesive layer, such as a contact adhesive. The backing layer may be formed integrally with ribs of sound reflecting material and in preferred embodiment is moulded from the same material. For example, a plastic may be moulded into a thin, preferably flexible, backing layer, with integral ribs. Sound absorbing material such as the open cell foams referred to above may then be moulded or formed into the gaps between the ribs to complete the lining.

Viewed from a third aspect, the invention provides a method of attenuating sound and or a method of providing a sound attenuating air vent, the method comprising: providing a discontinuous sound absorbing lining around at least a part of an air path through the air vent.

Preferably, the method includes a step of providing sound reflecting material in addition to the discontinuous sound absorbing material, as discussed above in relation to the vent of the invention. In a particularly preferred method, the method comprises providing a vent structure and providing the sound reflecting material integrally with the vent structure. Some of all of the vent structure may be formed of the same material as the sound reflecting material. For example, the method may comprise moulding walls of the vent structure with internal ribs. Moulded plastic, such as blow or vacuum moulded plastic may be used.

The method may comprise providing an air vent structure and/or the air vent may be formed using existing elements in a building. In preferred embodiments the method includes locating the sound attenuating air vent out of plane with a sound source and/or sound receiver. Multiple sound attenuating air vents may be provided, e.g. vents at different heights as discussed above.

Preferably, the method includes providing a discontinuous sound absorbing and optionally sound reflecting lining, wherein a period of discontinuity of elements of the lining is determined based on target frequencies for sound produced at a noise source at one end of the vent. This enables the vent to attenuate sound from the noise source. This arrangement is to be contrasted with linings utilising the organ pipe principle. With these types of arrangements, as in JP 8-152888, the period of discontinuity is not based on the frequency of sound produced at a noise source outside of the vent, but instead it is based on the resonant frequency of the vent itself.

The method may include installing the discontinuous lining in the vent prior to or during construction of an associated supporting structure, which may be a partition for location, in use, between a sound source and sound receiver. The lining may be installed by securing discontinuous elements within the vent, which may be a separate vent or duct, or may be an existing element in a building that is to be used as a wall of the vent. The lining may include a continuous backing layer, with sound absorbing material mounted on the backing layer in order to form the discontinuous layer of sound absorbing material. With this feature method may include installing the lining can be installed in the vent as a single element by securing the backing layer to an internal vent surface. As noted above, sound reflecting material can also be attached to the backing layer, or formed integrally with the backing layer.

Preferred embodiments of the method comprise providing the vent and/or lining with features as discussed above, to thereby provide a target sound attenuation performance. The target performance is preferably defined based on the unwanted noise at the source, the desired noise level at the receiver and the separating construction between source and receiver. In a preferred embodiment, the method includes determining a desired arrangement for the lining and/or the vent based on the target performance. Thus, the method may include a calculation enabling the vent and lining arrangement to be determined based on the source and receiver characteristics, using the target performance. The calculation may comprise determining the required vent shape and dimensions based on known relationships between vent shape and dimensions and the vent's acoustic and/or aerodynamic characteristics in order to meet acoustic and/or aerodynamic performance criteria set by the user. Alternatively or in addition, the calculation may comprise determining a lining arrangement based on a model of the acoustic performance of the lining and on acoustic performance criteria set by the user.

This latter calculation may be done by experimental measurements, with the method including testing of possible arrangements using mathematical models and numerical analysis to find optimal arrangements for attenuation of desired frequency ranges. In one preferred embodiment, a customised arrangement is provided to meet the user's needs. Alternatively, the method may include matching the user's needs to the performance of one of a number of predetermined lining arrangements, and providing the user with a recommendation for an appropriate lining arrangement selected from the predetermined arrangements.

Preferably, computer software is used to perform the calculation and assist a user in determining an appropriate vent design.

A method of designing a vent by means of such calculations is considered inventive in its own right, and therefore a fourth aspect of the invention provides a method of designing a sound attenuating air vent, the vent comprising an air path and a discontinuous sound absorbing lining around at least a part of the air path, the method comprising: determining a target attenuation performance based on the noise source, the receiver noise sensitivity and the separating construction, and determining a desired arrangement for the discontinuous lining and/or vent based on the target attenuation performance.

The target performance is preferably defined based on the unwanted noise at the source, the desired noise level at the receiver and the separating construction between source and receiver. The step of determining a desired arrangement for the lining and/or vent may comprise a calculation or calculations as discussed above. The vent and lining may include features as discussed above, including optionally the use of sound reflecting material.

Viewed from a further aspect, the invention provides a computer program product comprising instructions that when executed will configure a computer to perform a method of designing a sound attenuating air vent as set out above.

It will be appreciated that, although the preferred application of the present invention is ventilation in buildings, the advantageous effects of the invention and preferred embodiments are not limited to this application. Similar advantages can be attained in any application where free passage of air (unforced or forced) is required and the transmission of sound is undesirable. Thus, the invention may be used in any type of structure, machinery, vehicle or other application where these requirements are present.

BRIEF DESCRIPTION OF THE FIGURES

Certain preferred embodiments of the invention will now be described by way of example only and with reference to the accompanying drawings in which.

DETAILED DESCRIPTION

A sound attenuating air vent 1 comprises an air path 2 extending between two vent openings, with a discontinuous sound absorbing lining placed around the air path 2. The preferred lining is made up of sound absorbing material in the form of strips 3 of melamine foam. The flow of air through the air path 2 is across the width of the strips 3 as shown by the arrow X in FIG. 1. Passage of sound through the air path 2 in the direction of arrow X is attenuated by the strips 3.

Figure 1:
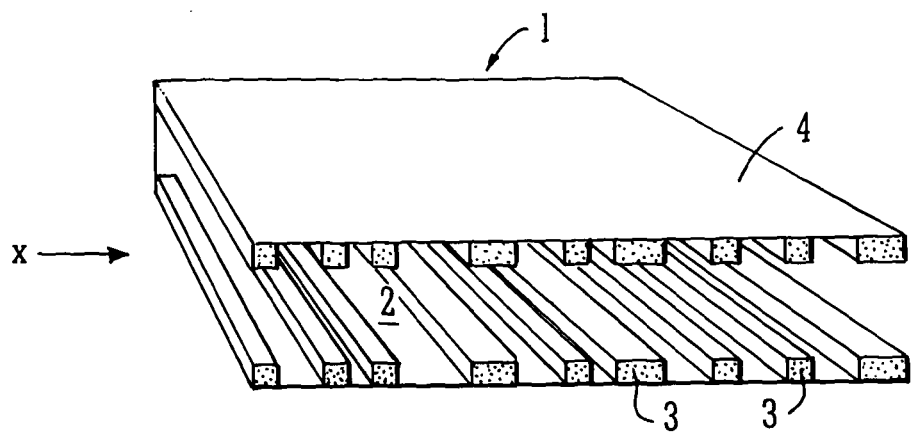
FIG. 1 shows a cut-away perspective sketch of a first embodiment of a sound attenuating vent, not to scale.

FIG. 1 is a perspective view that is cut-away through a longitudinal section of a vent and shows strips 3 applied with varying widths and varying spacings. The air path 2 is defined by an outer casing 4.

Figure 2:
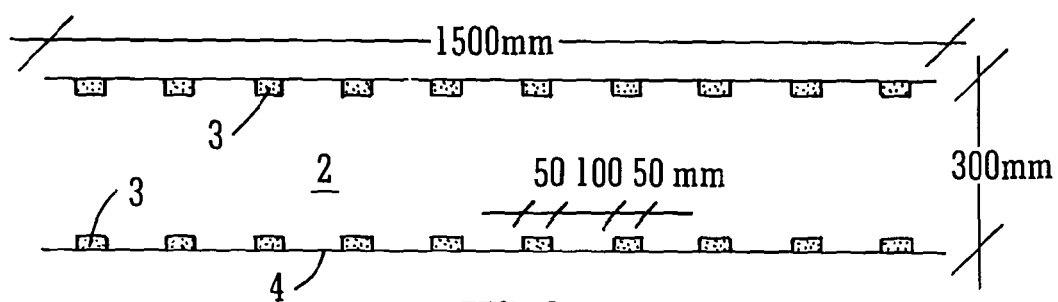
FIG. 2 shows a long section through a second embodiment of a sound attenuating vent with indicative example dimensions.

FIG. 2 shows a longitudinal cross-section through a similar vent, with casing 4 and strips 3. However, in FIG. 2 the strips 3 are evenly spaced instead of variably spaced as in FIG. 1. In FIG. 2 the strips 3 are of 50 mm width at 100 mm spacing, giving a period of 150 mm. The strips are about 25 mm in depth. FIG. 2 also illustrates a typical length and depth for a vent. The length and cross-section of the vent are selected for attenuation properties and for the required passage of air for ventilation. In the example of FIG. 2 the vent is 1500 mm long and 300 mm deep.

Figure 3:
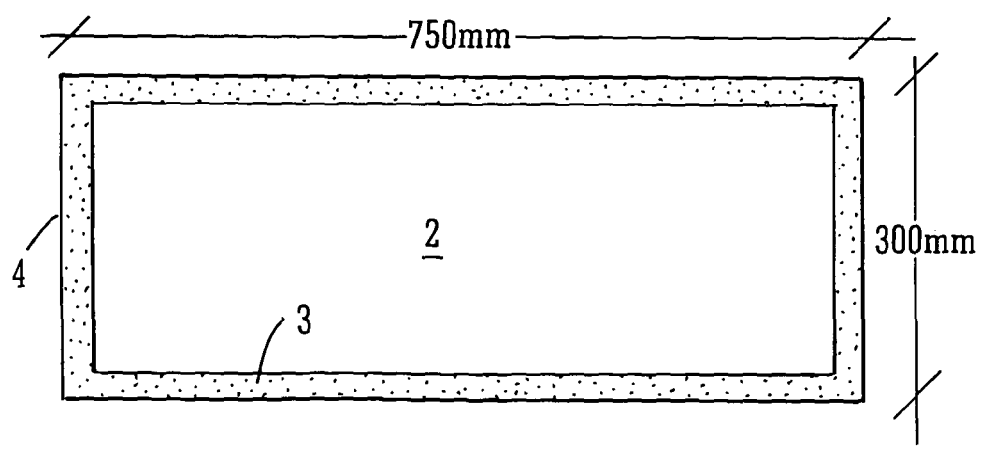
FIG. 3 shows a short section through the vent with indicative example dimensions.

FIG. 3 is a transverse section through the vent. The casing 4 is rectangular in section forming a rectangular air path 2. The strips 3 are placed around the entire inner surface of the vent. As shown in FIG. 3, for a vent that is 300 mm deep a typical width would be 750 mm.

The lining preferably includes sound reflecting material between the areas of sound absorbing material. In the context of the embodiment of FIG. 1 or FIG. 2 this feature is not shown, but could take the form of a strip or rib of a sound reflecting material (e.g. a dense plastic, or wood based board) located between the strips 3 of sound absorbing material.

Figure 4:
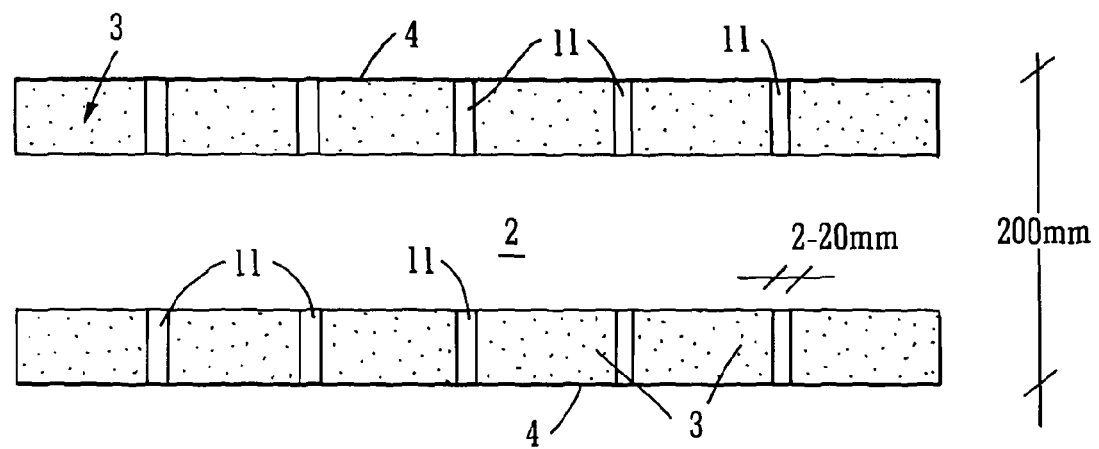
FIG. 4 shows a cross-section of a third embodiment of a sound attenuating vent, not to scale.

FIG. 4 gives an example of a vent including both sound absorbing material in strips 3, and sound reflecting material in ribs 11 between the strips. FIG. 4 shows the most preferred arrangement where there are no gaps between the strips 3 and ribs 11. By way of example, one possible set of dimensions uses a rib width of about 20 mm, a strip width of about 130 mm, and a thickness of about 50 mm for both the ribs 11 and strips 3.

The dimensions shown in the Figures are example dimensions only, and it should be appreciated that the vent 1, lining strips 3 and ribs 11 are not limited to these dimensions. Other sizes of vents 1 and other arrangements of strips 3 and ribs 11 can be selected based on the required acoustic and aerodynamic properties, and on the structure in which the vent/lining is to be installed. The table below sets out ranges of sizes for which the lining arrangements described herein are found to be particularly effective, although it should be noted that designs outside of these ranges may also find benefits in using the discontinuous lining.

| Description | Dimension, mm |
| --- | --- |
| Vent length | 200-1500 |
| Vent width/height | 100-750 |
| Lining thickness | 20-200 |
| Rib thickness | 20-200 |

Two typical applications for a sound attenuating air vent 1 in the context of unforced ventilation are given below:

(i) Cross-ventilation between internal spaces to enable warm 'used' air to be extracted to another space and out of the building. An example would be from a classroom or meeting room into an atrium with an opening rooflight controlled by the building management system.

(ii) Passive air supply into a space from the outside, through the building envelope. This may also be used in conjunction with a raised floor, with air being vented through the under floor cavity rather than straight into the space.

Other possible applications centre on the need to achieve sound attenuation over 2-3 octave bands with negligible pressure drop. Examples include externally mounted plant such as chillers, cross-talk attenuators and small ceiling mounted fan coil units. The sound attenuating air vent and lining described herein are not limited to any particular application and it will be understood that advantages can be provided in any application where free passage of air (unforced or forced) is required and where unrestricted transmission of sound is undesirable.

Figure 5:
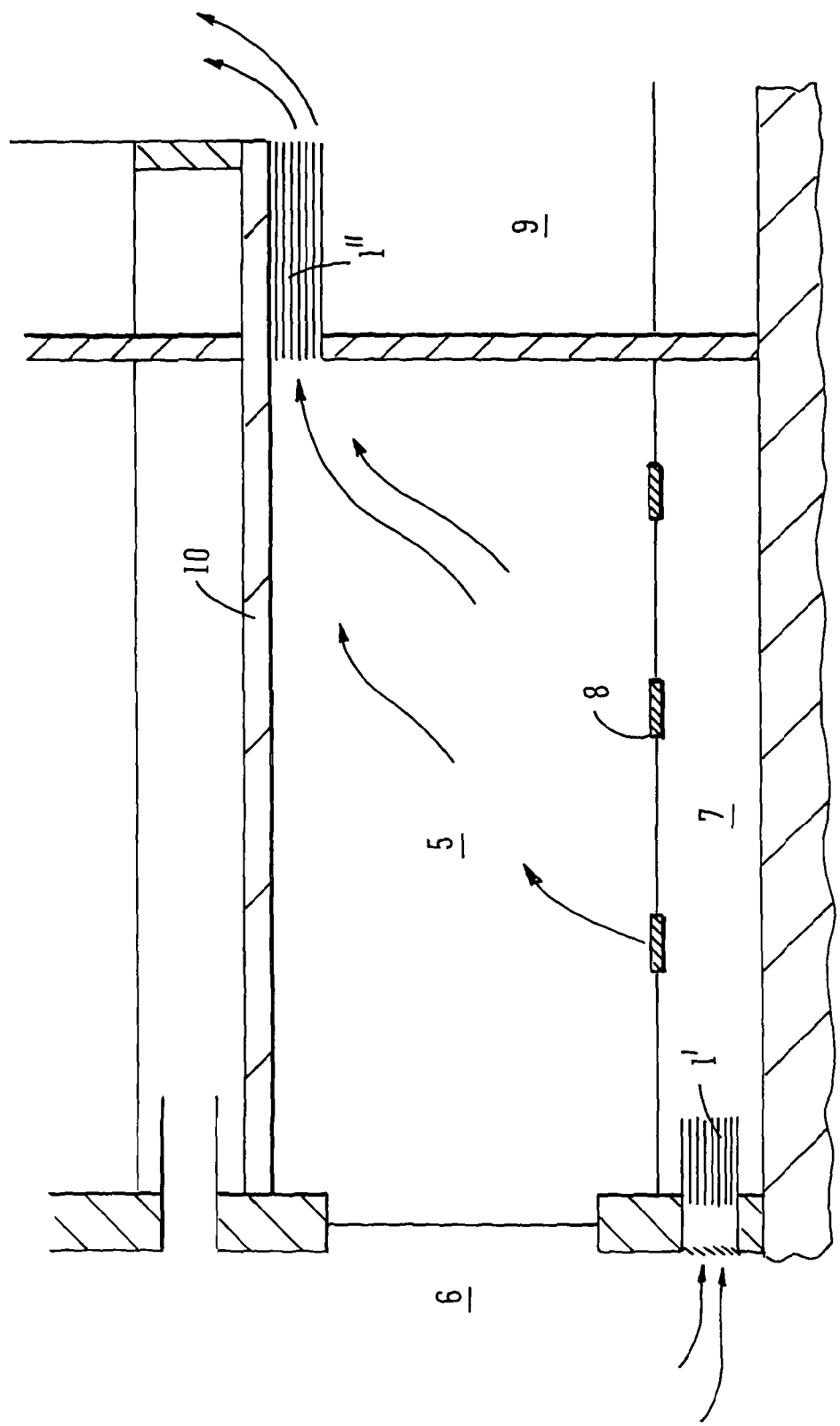
FIG. 5 shows an indicative installation, not to scale, including both fresh air and cross-ventilation applications.

FIG. 5 gives an illustrated example of the use of first and second sound attenuating air vents 1', 1" being used for passive ventilation of a noise sensitive room 5.

The room 5 is connected by a first vent 1' to the outside 6 for ventilation as in example (ii) above. The first vent 1' allows air to pass between the outside 6 and a floor void 7. This vent 1' is placed below floor level and is hence out of plane with the sound source, which would be outside, and/or the sound receiver, which would be in the room 5. The vent 1' would be designed for attenuation of undesirable sounds entering the building from the outside 6, such as traffic noise. Air can pass through the first vent 1' and the floor void 7 and into the noise sensitive room 5 via floor grilles 8. Arrows show the direction of air flow into the room 5.

The second sound attenuating air vent 1" connects the room 5 to a circulation space 9 such as an atrium, enabling 'used' air from the room 5 to be vented to the circulation space 9 as in example (i) above. The second vent 1" is at ceiling level and in fact the upper wall surface of the vent 1" can be formed by the slab 10 of the floor above. As the vent 1" is at a high level it is out of plane with the sound receiver, in the room 5, and/or out of plane with the sound source in the circulation space 9. The second vent 1" could be designed for attenuation of sounds arising in the circulation space 9, such as background conversation noise. Arrows show the direction of air flow out of the room 5 and into the circulation space 9.

As discussed above, the discontinuous lining can be supplied pre-installed in the vent 1, or the lining can be supplied separately, for example in the form of a roll of lining material that can be adhered to the casing 3 of the vent 1. In situations where it is advantageous to use a floor slab 10 or other structure as a wall of the vent 1, then this lining can be easily installed about the entirety of the vent 1 when the other walls of the vent 1 are formed.

Figure 6:
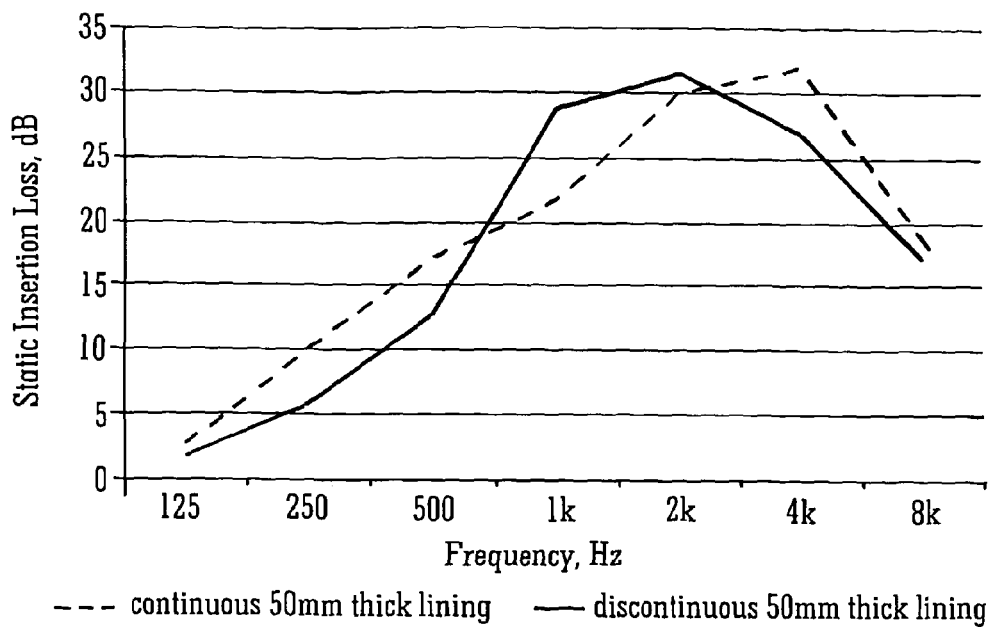
FIG. 6 is a graph showing the comparative performance of an example discontinuous lining with 50 mm thickness.
Figure 7:
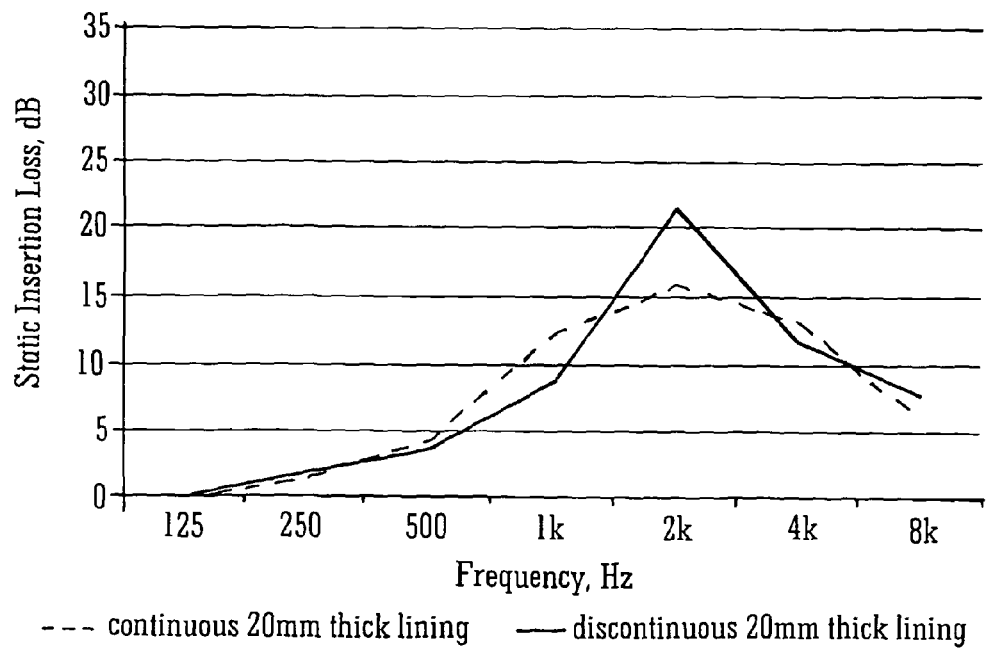
FIG. 7 is a graph showing the comparative performance of an example discontinuous lining with 20 mm thickness.

FIGS. 6 and 7 are graphs showing the acoustic performance of linings having a thickness of 50 mm and 20 mm respectively. Frequency of the sound is shown on the horizontal axis and the vertical axis shows static insertion loss, which is a measure of attenuation. The dashed line 12 shows the performance of a conventional continuous layer of the sound absorbing material. The solid line 13 shows the performance of a discontinuous lining of the type illustrated in FIG. 4. These tests used melamine foam with a density of about 11 kg/m$^3$ for the sound absorbing material and chipboard with a density of about 600 kg/m$^3$ for the sound reflecting material. In each case the discontinuous lining used 82 mm wide strips of sound absorbing material were and ribs formed of sound reflecting material 18 mm wide, giving a period of 100 mm for the discontinuity. Both the ribs and the strips had the same thickness, so as to present a continuous exposed surface in the vent.

As expected, the discontinuous lining results in an increase in attenuation at certain frequencies. The period of discontinuity is 100 mm which is a half-wavelength for frequencies of around 1.7 kHz, and the graphs show improved attenuation at this frequency and nearby frequencies. For the 50 mm thick lining FIG. 6 shows improved attenuation at a broad range of frequencies from about 700 Hz to 2 kHz, providing clear benefits. For the 20 mm lining FIG. 7 shows increased attenuation about a higher range of frequencies.

It will be understood that since the ribs and strips in the discontinuous lining have the same thickness, then the discontinuous lining is aerodynamically similar to the conventional continuous lining of the same thickness. Hence, the discontinuous lining provides improved acoustic performance by increasing attenuation at selected frequencies whilst maintaining the aerodynamic performance of the conventional design. Varying the period of discontinuity and the thickness of the lining enables different frequencies to be targeted.

A computer program product for designing a sound attenuating air vent and/or discontinuous lining can operate as follows. The computer program is graphic-orientated software that guides a user through the different steps of specifying a sound attenuating vent for their particular application. It starts with definition of noise source level, desired receiver noise level, constituent elements of the separating partition and the area of the vent required—this enables a target specification to be calculated. Other more detailed input information includes the position of source and receiver, and room details such as dimensions and surface finishes.

Once the user has specified the position of the vent, recommendations for dimensions and lining type are given by the program according to a look-up table populated with the results of the parametric study. The user may wish to change the recommended design (e.g. make it shorter) and this is accommodated by the program. If changes are made then the program determines if there is an impact on the other variables, and can issue an alert if the target specification will not be met.

The program will provide a summary page showing a typical elevation, section and detail, together with other more quantitative information. There is an option to listen to the sound transmission through the vent based on attenuation properties of the vent determined by the program—generic sound files will be made available for the most common room types.

The main user interface comprises separate graphical objects that will serve as program input and output of data. Any suitable programming language or platform can be used for to generate the interface. Preferred platforms are Adobe Flash™ and Adobe Shockwave 3D™. The interface will show the arrangement of the noise source, noise receiver and separating construction schematically based on data input by the user, and a 3D object representing the end product will also be shown Section—a 2D image that will update automatically as the user enters data. The image will be a generic cross-section along a line between noise source and noise receiver, comprising of two spaces separated by a partition wall. Typical parameters to be entered on this object via dropdown menus are: room/space size (l, w, h), room/space type, wall finishes and so on. The image is annotated by values set by the user and by values generated by the program. Further annotations could include images such as people.

Elevation—this could be a 2D image or a 3D object showing the separating construction in elevation. The elevation gets dynamically updated based on parameters entered. It shows the locations of vents, doors and windows. It also contains annotations, type and dimensions. There are options for the user to add/remove doors and windows.

Vent/lining design—illustrated by a 3D object that the user can move, rotate etc. This object is dynamically updated based on parameters entered. Overlaid on top of this object will be annotations e.g. vent dimensions, a description of the sound absorbing lining and so on.

The graphical objects for the section and elevation contain drop-down lists allowing the user to change parameters, which in-turn update all graphical objects. For example, if the user were to change an element of the separating construction from brick to plasterboard, the acoustic properties of the room will change and the vent/lining design 3D object is updated accordingly.

Another significant part of the interface is information tables. These can be a combination of tables showing information. Some cells can be editable. Updating information in these cells will update the graphical objects described above. These tables could be expandable tabs i.e. a toggle between title and table, or any other suitable format.

The user enters data into the program via dropdown menus and/or text input. The program also includes or has access to libraries on known pre-defined construction databases. For example, the program uses standard calculations and data relating to acoustic parameters to determine the acoustic properties of a space defined by the user by its dimensions and wall type. The various options available to the user are picked up by the program from a spreadsheet defining ranges of parameters for standard elements. This information is used by the program to generate drop-down lists, display appropriate titles to the user and know what multiplication factors to apply to the calculations.

In its simplest form, the output of the program is an image based on what is currently displayed on the screen. This can be saved to a number of image formats such as jpg, tiff, bmp etc. The program can also send this image to any connected printer. This simple output can be used for small or one-off installations or just as a visualisation tool for the end user. Additional outputs for use in more complex jobs or as input data for other systems or processes, such as an order setting out vents and lining materials required, take the form of spreadsheet files listing the components required and other parameters. For example the data included might number of vents, type, vent and/or lining details and so on.

The program can also provide output sound files representing a simulation of sound at the receiver and at the source. This provides an indication of the acoustic performance of the vent/lining. The user can listen to simulations of noise transmitted by unlined vents or alternative vent constructions for comparison purposes.

A design for a sound attenuating air vent or lining with desired acoustic and aerodynamic properties can hence be derived either based on the output from the computer program, or based on a manual design process using the principles discussed above.

The invention claimed is:

1. A sound attenuating air vent for passive ventilation between two areas of a building or between a building and the outside, the air vent comprising: an air path and a discontinuous sound absorbing lining around at least a part of the air path, and sound reflecting material between areas of the discontinuous sound absorbing lining; wherein the discontinuous sound absorbing lining comprises strips of sound absorbing material positioned in the vent so as to be generally perpendicular to the direction of the air flow and sound propagation; wherein the sound reflecting material comprises ribs of sound reflecting material provided between some or all of the strips of sound absorbing material.

2. The sound attenuating air vent as claimed in claim 1, wherein the air path is a direct air path.

3. The sound attenuating air vent as claimed in claim 1, arranged for placement between a sound source and sound receiver out of plane with the sound source and/or wherein the air path has a length such that line of sight between source and receiver is broken.

4. The sound attenuating air vent as claimed in claim 1, wherein the sound reflecting material substantially fills gaps between the discontinuous sound absorbing lining to thereby form a substantially continuous lining in the vent.

5. The sound attenuating air vent as claimed in claim 1, wherein a width and a spacing of the strips and/or ribs is selected based on a desired frequency range to be attenuated.

6. The sound attenuating air vent as claimed in claim 1, wherein a period of discontinuity of the strips and/or ribs is selected to be about a half-wavelength of the fundamental frequency in a frequency range to be attenuated.

7. The sound attenuating air vent as claimed in claim 3, wherein the discontinuous sound absorbing lining is arranged so as to include multiple periods of discontinuity selected to correspond to a desired set of frequencies in a frequency range to be attenuated.

8. The sound attenuating air vent as claimed in claim 1, wherein the vent has a shape, dimensions, and/or discontinuous lining selected based on a target performance.

9. The sound attenuating air vent as claimed in claim 1, comprising ribs of sound reflecting material integrally formed with the structure of the vent.

10. A lining for a sound attenuating air vent for passive ventilation between two areas of a building or between a building and the outside, the lining comprising a discontinuous layer of sound absorbing material and sound reflecting material between areas of the discontinuous sound absorbing material; wherein the discontinuous sound absorbing material comprises strips of sound absorbing material positioned in the vent so as to be generally perpendicular to the direction of the air flow and sound propagation; and wherein the sound reflecting material comprises ribs of sound reflecting material provided between some or all of the strips of sound absorbing material.

11. The lining as claimed in claim 10, comprising a backing layer, wherein the sound absorbing material is mounted on the backing layer in order to form the discontinuous layer of sound absorbing material.

12. A partition which, in use, is between a noise source and a noise receiver, the partition comprising a sound attenuating air vent comprising: an air path and a discontinuous sound absorbing lining around at least a part of the air path, and/or an air vent lined with a lining as claimed in claim 10, the vent(s) being positioned to be out of plane with the sound source and or receiver.

13. A method of providing a sound attenuating air vent for passive ventilation between two areas of a building or between a building and the outside, the method comprising: providing a discontinuous sound absorbing lining around at least a part of an air path through the air vent, the sound absorbing comprising strips of sound absorbing material positioned in the vent so as to be generally perpendicular to the direction of the air flow and sound propagation; and providing sound reflecting material between areas of sound absorbing material;

wherein in that the sound reflecting material comprises ribs of sound reflecting material provided between some or all of the strips of sound absorbing mate.

14. The method as claimed in claim 13, comprising locating the sound attenuating air vent out of plane with a sound source and/or sound receiver.

15. The method as claimed in claim 13, comprising moulding walls of the vent structure with internal ribs of sound reflecting material.

16. The method as claimed in claim 13, wherein the lining comprises discontinuous elements fixed to a backing layer, and the method comprises a step of installing the discontinuous lining by securing the backing layer to an internal surface of the air vent.

17. The method as claimed in claim 13, comprising providing a vent comprising an air path and a discontinuous sound absorbing lining around at least one of at least a part of the air path and a lining comprising a backing layer, wherein the sound absorbing material is mounted on the backing layer in order to form the discontinuous layer of sound absorbing material to thereby provide a target sound attenuation performance, wherein the target sound attenuation performance is determined based on the unwanted noise at the source, the desired noise level at the receiver and the separating construction between source and receiver.

18. A method as claimed in claim 17, comprising determining required vent shape and dimensions based on known relationships between vent shape and dimensions and the vent's acoustic and/or aerodynamic characteristics in order to meet acoustic and/or aerodynamic performance criteria set by the user; and/or determining the lining arrangement based on a model of the acoustic performance of the lining and on acoustic performance criteria set by the user.

19. The method as claimed in claim 17 comprising matching the user's needs to the performance of one of a number of predetermined lining arrangements, and providing the user with a recommendation for an appropriate lining arrangement selected from the predetermined arrangements.

20. The method as claimed in claim 17, wherein the lining comprises sound absorbing material between areas of the discontinuous sound absorbing lining.

* * * * *